C. P. EBERSOLE.
FLUID PRESSURE ENGINE.
APPLICATION FILED AUG. 8, 1908.
942,441.
Patented Dec. 7, 1909.
4 SHEETS—SHEET 1.
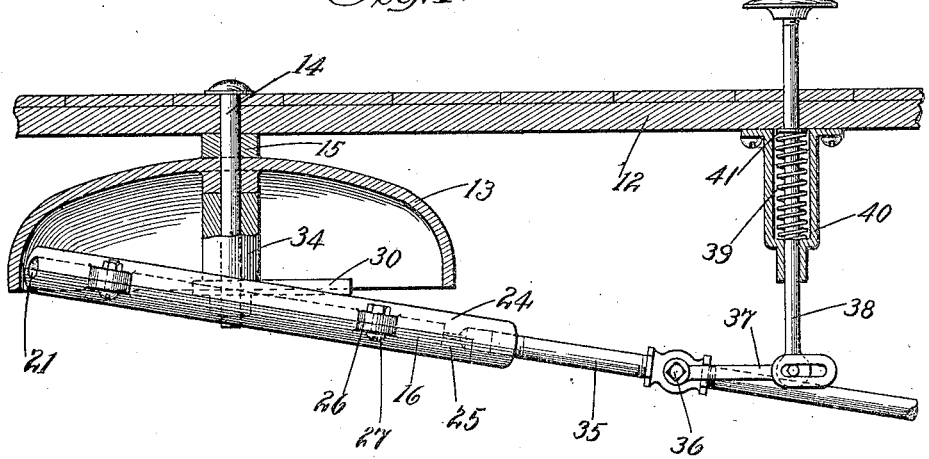
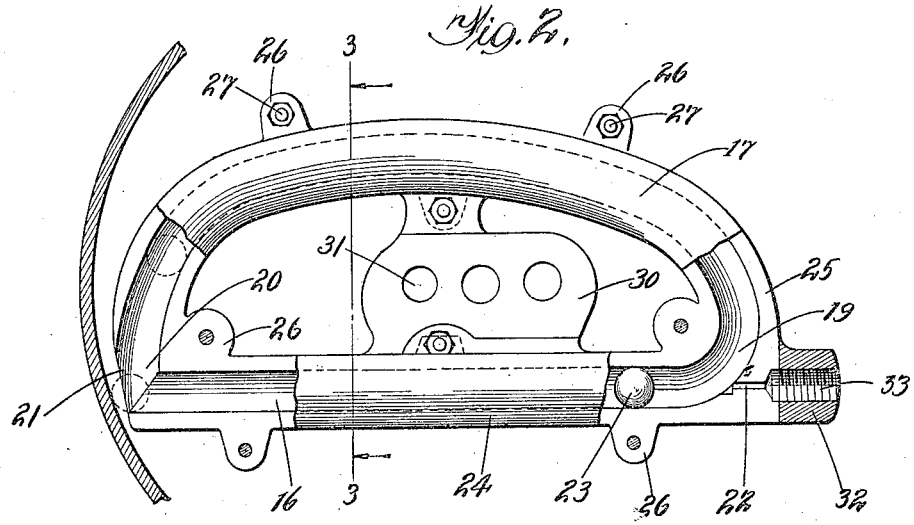
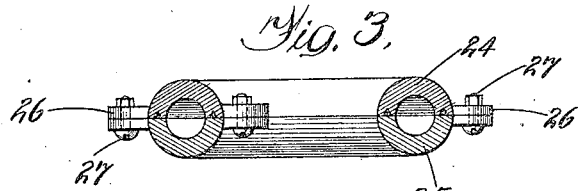
Witnesses:
Inventor:
Cyrus P. Ebersole
By Jones, Addington & Ames,
Attorneys.

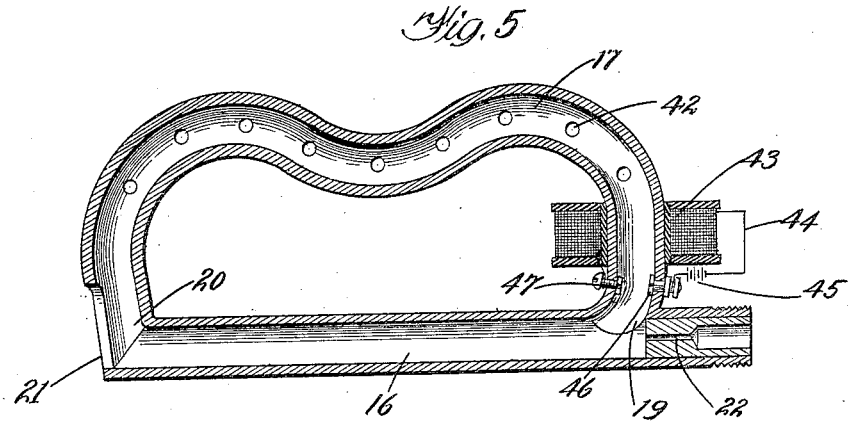
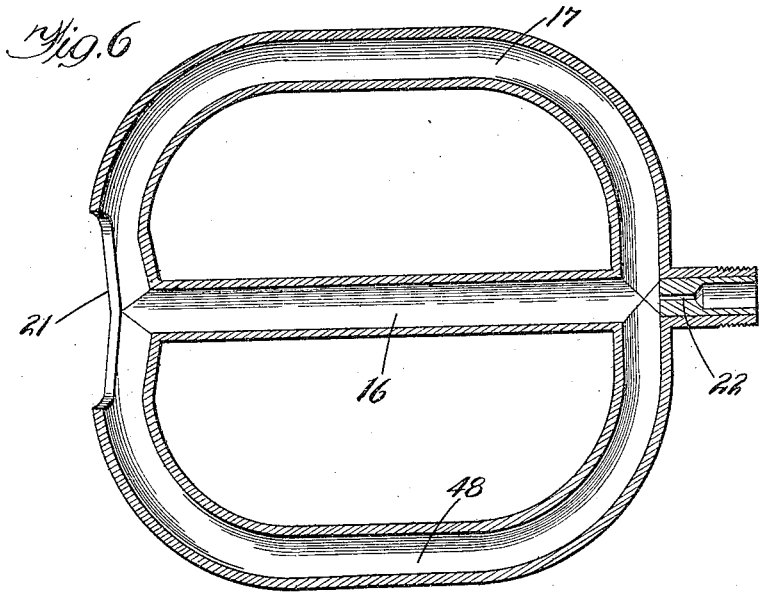
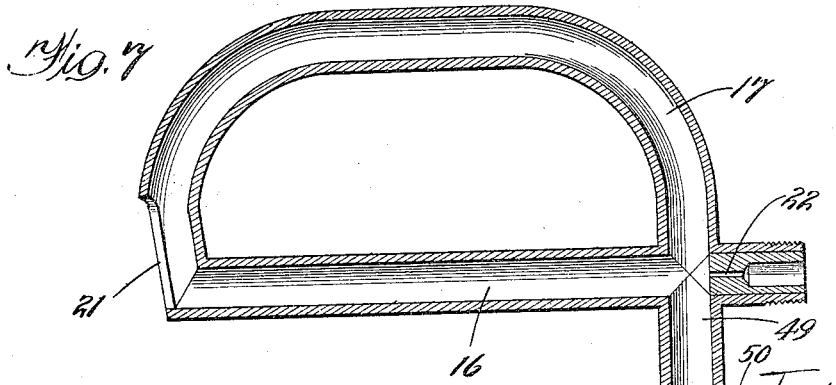

C. P. EBERSOLE.
FLUID PRESSURE ENGINE.
APPLICATION FILED AUG. 8, 1908.
942,441.
Patented Dec. 7, 1909.
4 SHEETS—SHEET 3.
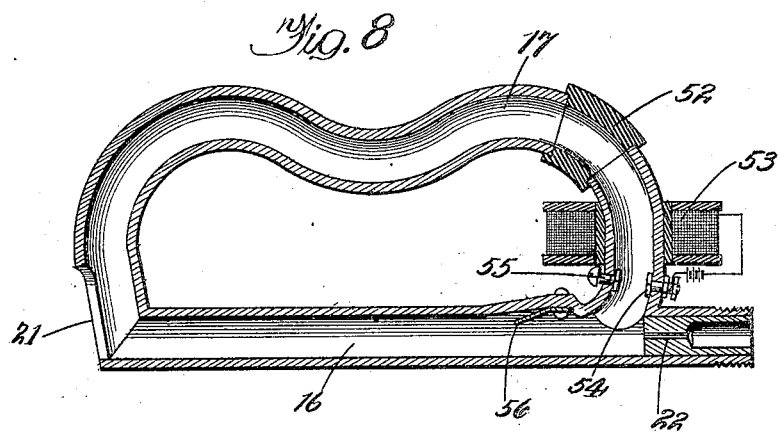
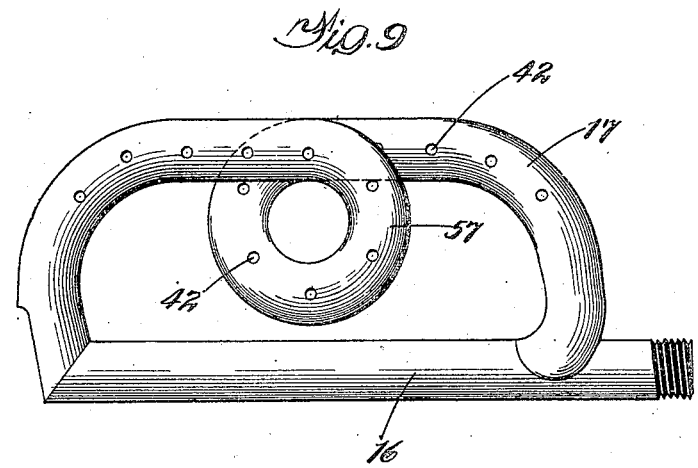
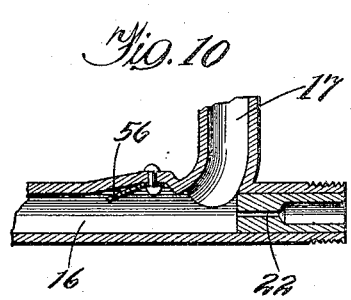
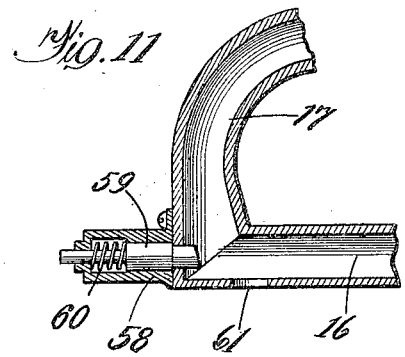
Witnesses:
Inventor:
Cyrus P. Ebersole
By Addington
Attorneys.

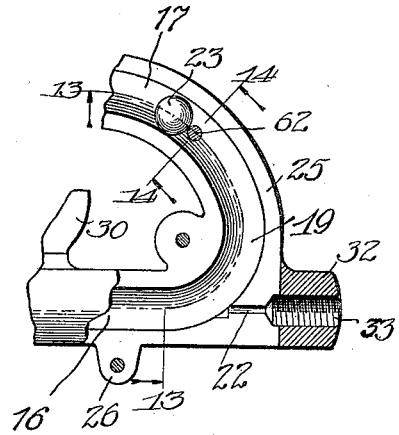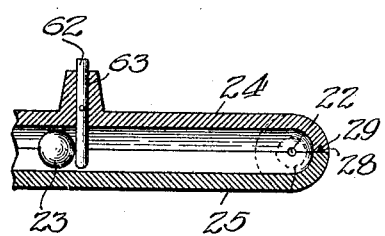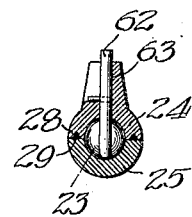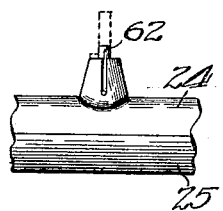

UNITED STATES PATENT OFFICE.

CYRUS P. EBERSOLE, OF KEOKUK, IOWA, ASSIGNOR TO ELECTRIC SERVICE SUPPLIES COMPANY, OF PHILADELPHIA, PENNSYLVANIA, A CORPORATION OF NEW JERSEY.

FLUID-PRESSURE ENGINE.

942,441.  Specification of Letters Patent.  Patented Dec. 7, 1909.

Application filed August 8, 1908. Serial No. 447,566.

*To all whom it may concern:*

Be it known that I, CYRUS P. EBERSOLE, a citizen of the United States, residing at Keokuk, in the county of Lee and State of Iowa, have invented new and useful Improvements in Fluid-Pressure Engines, of which the following is a full, clear, concise, and exact description, reference being had to the accompanying drawing, forming a part of this specification.

My invention relates to improvements in fluid pressure operating engines.

One of the objects of my invention is to provide an engine of the above character in which all valves for causing the plunger to operate are eliminated, and the device is reduced to the simplest form of construction.

I have illustrated in the accompanying drawings various forms which my invention may take, but it will be understood that while I have illustrated a number of modifications of my inventions, various other changes may be made within the scope of the appended claims without departing from the spirit of my invention.

In the drawings—Figure 1 is a sectional view of a bell showing my invention applied for ringing the same; Fig. 2 is a plan view of my invention, parts of the same being shown in section; Fig. 3 is a section on the line 3—3 of Fig. 2; Fig. 4 is an enlarged detail of the section illustrated in Fig. 3; Figs. 5, 6, 7 and 8 are sectional views of modifications of my invention; Fig. 9 is a plan view of another modified form of my invention; Fig. 10 is a detail view showing the spring retarding member used alone; Fig. 11 is a sectional view showing my invention as being applied to a pneumatic hammer or the like; Fig. 12 is a detail view showing a means for stopping and starting the blow delivering device when the pressure is continuously admitted; Fig. 13 is a sectional view on the line 13—13 of Fig. 12; Fig. 14 is a sectional view on the line 14—14 of Fig. 12; and Fig. 15 is a detail view showing one means for holding the stop raised.

In Fig. 1, for the purpose of describing one application of the same, I have shown my invention as being used for ringing a bell, but it will be understood that this is merely for the purpose of disclosing my invention, and that the same may be applied to such other uses as may be desired. In said figure I have shown attached to the bottom of the platform 12 of a car or like vehicle, a bell 13. This bell is held in position by a bolt 14 extending through the platform and through a stud 15 formed in the center of the bell.

The engine, in the form illustrated, comprises a fluid pressure cylinder 16 and a vacuum cylinder 17. Looking at my invention in another aspect, however, it comprises a delivery raceway 16 and a return raceway 17. Looking at my invention from still another aspect, it comprises a cylinder having a continuous raceway (using the same reference numerals, said raceway being comprised of the two sections 16 and 17) provided at one point with an admission port and at another point with a relief or escape port. However, for the purpose of describing my invention, I shall use the terms pressure cylinder and vacuum cylinder, as these terms seem more applicable to the form of my invention which I have illustrated. The vacuum cylinder communicates with the pressure cylinder at 19 and at 20. The pressure cylinder is provided at its front end with an opening 21 and at its rear end with an intake port 22. A blow delivering member 23, which I have illustrated in the form of a ball, is adapted to operate in the two cylinders, and deliver the necessary hammer blow to the bell 13. Although I have shown the ball as being an exact fit for the cylinder this is not necessary as balls of smaller size will operate just as satisfactorily.

In practice the two cylinders are preferably formed from a pair of casings 24 and 25 which are provided with lugs or ears 26 through which bolts 27 are adapted to pass for securing the two castings together. For preventing leakage when the two castings are secured together, one of the castings has formed in the meeting face thereof a channel 28 in which is adapted to fit a lead wire 29, which forms a packing, and prevents leakage at the joint of the two castings. The lower casting is provided with a web 30 which is preferably formed integrally therewith, and has formed therein a plurality of openings 31 through which securing bolts may be passed for holding the engine in position. The rear end of the casting is provided with a boss or projection 32 having a central opening provided with internal screw-threads 33 into which is adapted to be secured the fluid pressure supply pipe or hose.

In mounting the engine in position for operating the bell 13, the bolt 14 is adapted to pass through one of the openings 31, and a washer 34 is interposed between the web 30 and the stud 15 of the bell to maintain the engine in its position. The web 30 is preferably set at a slight angle to the engine so that the engine will assume an angular position when placed in position with respect to the bell. The fluid pressure supply pipe 35 communicates with the port 22 and is provided with a valve 36 for controlling the admission of fluid under pressure. This valve is preferably connected by an arm 37 with a plunger 38 extending up through the car platform 12 so that it may be operated by the foot of the motorman of the car. A coiled spring 39 arranged within a suitable housing 40 and at its upper end bearing against a collar 41 maintains the plunger 38 in its upper position.

When fluid under pressure is admitted through the port 22, the ball 23 is driven forward, and at the outer end of the cylinder strikes the bell 13 through the opening 21. The passage of fluid under pressure through the pressure cylinder and past the opening 19 creates a partial vacuum, by siphonic action, in the vacuum cylinder 17, so that after the ball has struck the bell 13, it is taken up by the partial vacuum in the cylinder 17 and returned to the rear of the engine, passing again to the cylinder 16 at the rear end through the communicating opening 19. In practice the engine is so set with respect to the bell that the bell forms a slight angle at the point where the ball or plunger 23 hits it, whereby a slight "English" is given to the ball which throws it on its rebound into the vacuum cylinder 17. While, by this arrangement, I may probably be enabled to obtain better results, I have found that the invention will, however, work even though the ball hits a square blow on the bell or other object. I have also found that the vacuum or partial vacuum in the vacuum cylinder 17 is sufficient after the pressure has been turned on in the pressure chamber 16 to return the ball through the vacuum chamber and deliver it into the pressure chamber, even though the ball is at the outer end of the pressure chamber. In operation, the ball continues to pass around the raceway formed by the pressure cylinder 16, and the vacuum cylinder 17, delivering on each cycle a single stroke to the bell 13.

In Fig. 5 I have illustrated a modification of my invention, in which I have provided one means for retarding the travel of the ball, so that the strokes will be slower. In this form the vacuum cylinder 17 is given an irregular shape, in order that the friction on the ball will be greater, aiding in retarding the movement of the ball. Openings 42 are also formed in the cylinder to decrease the vacuum formed therein, and at the rear end of the cylinder surrounding the same I provide a solenoid 43. One terminal of the solenoid is connected by a conductor 44 with one terminal of the source of supply, such as a battery 45. The opposite terminal of the battery is connected with a contact 46, which extends through the walls of the cylinder and projects slightly from the wall thereof. The opposite terminal of the winding of the solenoid 43 is connected to a contact 47 which also extends into the cylinder, so that as the ball or plunger 23 passes this point it will engage the contacts 46 and 47, closing the circuit through winding of solenoid, and the movement of the ball will be further retarded before it passes into the cylinder 16. While I have shown in this figure, three means for retarding the ball, it will be understood that any one may be used independently of the other. For instance, the vacuum decreasing openings 42 and the solenoid 43 may be dispensed with, the operator depending merely upon the friction caused by the irregular shape of the cylinder 17 to retard the movement of the ball. Likewise, the irregular shape and the solenoid may be dispensed with, the operator depending merely upon the reduced vacuum to more slowly return the ball. Also, the irregular shape and the openings may be dispensed with and the operator merely depend upon the solenoid for retarding the ball.

In the modification in Fig. 6 I provide, in addition to the vacuum cylinder 17, a second vacuum cylinder 48. In this construction, when the ball is driven forward in the pressure cylinder 16, it will have two paths to follow, and sometimes will return in the cylinder 17, while at other times will return in the cylinder 48. In the operation of this form of my invention, assuming that the ball returns in the cylinder 17, instead of passing into the cylinder 16 it will pass into the cylinder 48 and will travel forward in this cylinder until its momentum is overcome by the vacuum, when it will be returned and if not going too swiftly, will be taken up by the fluid pressure and driven forward in the cylinder 16. If, however, its momentum is sufficient, the ball will pass into the cylinder 17, and thus teeter back and forth in the two cylinders 17 and 48, until it is finally caught up by the pressure in the cylinder 16 and driven forward upon another stroke.

In the modification illustrated in Fig. 7, I have provided a chamber 49 which is a continuation of the cylinder 17 and is provided with a port 50, the size of which is controlled by a needle valve 51. In this form of my invention, as the ball returns in the cylinder 17 it will be driven into the chamber 49 and then will be drawn back into the cylinder 16.

In the modification illustrated in Fig. 8, I have introduced in the cylinder 17, a short section 52 of non-magnetic material, such as brass or the like, whereby, when the circuit is closed through the solenoid 53 which surrounds the cylinder, by the ball engaging the two contacts 54 and 55, the cylinder is converted into a horse-shoe magnet, which exerts a retarding effect upon the ball to make the strokes of the ball slower. In addition to this retarding device, I have secured in the cylinder 16 a spring 56, against which the ball is adapted to strike in its passage through the cylinder. This structure is also illustrated in detail in Fig. 10.

In the modification in Fig. 9, the cylinder 17 is increased in length by making a loop 57 therein, around which the ball passes before reaching the rear end of the cylinder. This not only increases the distance the ball has to travel on its return, but also increases the friction on the ball, thereby retarding the movement of the same. I have also illustrated in this figure the vacuum reducing openings 42.

In Fig. 11 I have shown my invention as applied to a pneumatic hammer. In this structure, at the end of the cylinder 16, I have secured a casing 58 in which is adapted to operate a plunger 59. The rear end of the plunger extends into the cylinder 16. A coiled spring 60 maintains the plunger 59 in its retracted position and returns the same after the ball strikes it and drives it forward. An opening 61 corresponding to the opening 21 in the other figures, is formed in the side of the cylinder 16.

In some instances it may be desired to admit the fluid under pressure to the cylinder continuously and dispense with the valve 36. Under these circumstances when the fluid is admitted continuously to the cylinder 16 I provide a movable stop preferably at the rear end of the cylinder 17 which may be used to prevent the blow delivering member from entering the cylinder 16 and thereby prevent the blow delivering member from operating. In the form illustrated this stop comprises a removable pin 62 adapted to extend through an opening 63, into the cylinder 17 and in the path of the ball 23. As long as the pin is in position the ball will be prevented from entering the cylinder 16 and therefore cannot operate. A removal of the pin, however, permits the ball to move into the cylinder and it will be driven through its cycle of operation as previously described until the pin is again dropped into place. The pin, of course, can be operated or controlled by any desired means.

It will, of course, be understood that the above device can be used with or without the previously described means for retarding the travel of the ball.

Having thus described my invention what I claim as new and desire to secure by Letters Patent, is:—

1. In a fluid pressure engine, the combination with a pressure cylinder and a vacuum cylinder, of a blow delivering member adapted to be moved in one direction in said pressure cylinder and moved in an opposite direction in said vacuum cylinder.

2. In a fluid pressure engine, the combination with a blow delivering member, of means by which said member is caused to move in one direction by fluid under pressure and in an opposite direction by a vacuum.

3. In a fluid pressure engine, the combination with a blow delivering member, of a pressure cylinder, and a vacuum cylinder, said cylinders being so related that the admission of fluid under pressure to one of said cylinders creates a vacuum in the other.

4. In a fluid pressure engine, the combination with a pressure cylinder and a vacuum cylinder, a blow delivering member operating in said cylinders, the vacuum cylinder communicating with the pressure cylinder at the forward and rear ends thereof.

5. In a fluid pressure engine, the combination with a pressure cylinder and a vacuum cylinder, a blow-delivering member operating in said cylinders, the vacuum cylinder communicating with the pressure cylinder at two points.

6. In a fluid pressure engine, the combination with a pressure cylinder and a vacuum cylinder, of a blow delivering member adapted to be moved in one direction in said pressure cylinder and moved in an opposite direction in said vacuum cylinder, and means for controlling the rate at which the blows are given by said member.

7. In a fluid pressure engine, the combination with a blow delivering member, of means by which said member is caused to move forward by fluid under pressure and returned under the influence of a vacuum, and means for controlling the rate at which the blows are given by said member.

8. In a fluid pressure engine, the combination with a blow delivering member, of a pressure cylinder and a vacuum cylinder, said cylinders being so related that the admission of fluid under pressure in one of said cylinders creates a vacuum in the other, and means for controlling the rate at which the blows are given by said member.

9. In a fluid pressure engine, the combination with a pressure cylinder, of a vacuum cylinder, a blow delivering member operating in said cylinders, the vacuum cylinder communicating at two points with said pressure cylinder, and means for controlling the rate at which the blows are given by said member.

10. In a fluid pressure engine, the combination with a cylinder having a delivery passage and a return passage, of a blow delivering member operating in said passages and adapted to move on its delivery stroke in one passage and on its return stroke in the other passage.

11. In a fluid pressure engine, the combination with a cylinder having a delivery passage and a return passage, of a blow delivering member operating in said passages and adapted to move on its delivery stroke in one passage, and on its return stroke in the other passage, and means for controlling the rate at which the strokes are given by said member.

12. In a fluid pressure engine, the combination with a cylinder having a continuous raceway therein, of a blow delivering member operating in said raceway and adapted to be driven around the same, said cylinder having at one point an opening therein to permit said member to deliver a blow.

13. In a fluid pressure engine, the combination with a cylinder having a continuous raceway, of a blow delivering member operating in said raceway and adapted to be driven around the same, said cylinder having at one point an opening therein to permit said member to deliver its blow, and means for controlling the rate at which the blows are given by said member.

14. In a fluid pressure engine, the combination with a cylinder having a continuous raceway therein, of a blow delivering member operating in said raceway and adapted to be driven around the same, said cylinder having at one point an admission port and at another point a relief port.

15. In a fluid pressure engine, the combination with a cylinder having a continuous raceway therein, of a blow delivering member operating in said raceway and adapted to be driven around the same, said cylinder having at one point an admission port and at another point a relief port, and means for controlling the rate at which the blows are given by said member.

16. In a fluid pressure engine, the combination with a cylinder having a continuous path therein, of a blow delivering member operating in said path, said cylinder having an admission port formed at one point therein and a relief port formed at another point, and so related to said admission port that said raceway has a pressure in one part and a vacuum in another part.

17. In a fluid pressure engine, the combination with a cylinder having a continuous path therein, of a blow-delivering member operating in said path, said cylinder having an admission port formed at one point therein, and a relief port therein at another point, and so related to said admission port that said raceway has a pressure in one part and a vacuum in another, and means for controlling the rate at which the blows are delivered by said member.

18. In a fluid pressure engine, the combination with a cylinder having a continuous raceway therein, of a blow delivering member operating in said raceway, said cylinder having an admission port formed therein at one point and a relief port formed therein at another point, and so related to said admission port that said raceway has a pressure in one part thereof and a vacuum in another part thereof, and means for controlling said vacuum.

19. In a fluid pressure engine, the combination with a cylinder having a delivery path and a return path, a blow-delivering member adapted to operate in said paths, the blow delivering member being caused to move in one of said paths to deliver a blow by fluid under pressure and after the blow has been delivered being siphoned back to normal position in the other path.

20. In a fluid pressure engine, the combination with a cylinder having a delivery path and a return path, a blow-delivering member adapted to operate in said paths, the blow delivering member being caused to move in one of said paths to deliver a blow by fluid under pressure and after the blow has been delivered being siphoned back to normal position, and means for controlling the rate at which the blows are given by said member.

21. In a fluid pressure engine, the combination with a pressure cylinder, of a vacuum cylinder, a blow-delivering member operating in said cylinders, and means for deflecting said blow-delivering member into said vacuum cylinder after the same has delivered its blow.

22. In a fluid pressure engine, the combination with a pressure cylinder and a vacuum cylinder, of a blow-delivering member adapted to be moved in one direction in said pressure cylinder and moved in an opposite direction in said vacuum cylinder, and a controllable stop for preventing the movement of said member when desired.

23. In a fluid pressure engine, the combination with a blow-delivering member, of means by which said member is caused to move in one direction under the influence of fluid under pressure and in an opposite direction under the influence of a vacuum, and a controllable stop for preventing the movement of said member when desired.

24. In a fluid pressure engine, the combination with a pressure cylinder and a vacuum cylinder, of a blow-delivering member adapted to be moved in one direction in said pressure cylinder and in an opposite direction in said vacuum cylinder, means for controlling the rate at which the blows are given by said member, and a controllable stop for preventing the movement of said member when desired.

25. In a fluid pressure engine, the combination with a blow-delivering member, of means for causing said member to move in one direction under the influence of fluid under pressure and in an opposite direction under the influence of a vacuum, means for controlling the rate at which the blows are given by said member, and a controllable stop for preventing the movement of said member when desired.

26. In a fluid pressure engine, the combination with a cylinder having a delivery passage and a return passage, of a blow-delivering member operating in said passages and adapted to move on its delivery stroke in one passage and on its return stroke in another passage, and a controllable stop for preventing the movement of said member when desired.

27. In a fluid pressure engine, the combination with a cylinder having a continuous raceway therein, of a blow-delivering member operating in said raceway and adapted to be driven around the same, said cylinder having at one point an admission port and at another point a relief port, and a controllable stop for preventing the movement of said member when desired.

28. In a fluid pressure engine, the combination with a cylinder having a continuous raceway therein, of a blow-delivering member operating in said raceway and adapted to be driven around the same, said cylinder having at one point an admission port and at another point a relief port, means for controlling the rate at which the blows are given by said member, and a controllable stop for preventing the movement of said member when desired.

In witness whereof, I have hereunto subscribed my name in the presence of two witnesses.

CYRUS P. EBERSOLE.

Witnesses:
  G. W. Cox,
  C. A. Loeffler.